United States Patent [19]
Johnson et al.

[11] Patent Number: 5,987,536
[45] Date of Patent: Nov. 16, 1999

[54] COMPUTER SYSTEM HAVING FLASH MEMORY BIOS WHICH CAN BE ACCESSED WHILE PROTECTED MODE OPERATING SYSTEM IS RUNNING

[75] Inventors: Robert D. Johnson, Raleigh; Howard J. Locker, Cary; Jerry W. Pearce, Apex; Randall S. Springfield, Chapel Hill, all of N.C.; Donald D. Williams, Boca Raton, Fla.

[73] Assignee: International Business Machines Corporation, Armonk, N.Y.

[21] Appl. No.: 08/861,555

[22] Filed: May 22, 1997

[51] Int. Cl.$^6$ ................................................. G06F 15/02
[52] U.S. Cl. ................................................. 710/36; 710/5
[58] Field of Search ................................. 395/430, 700, 395/821, 822, 823, 855, 856, 825; 364/200

[56] References Cited

U.S. PATENT DOCUMENTS

| | | | |
|---|---|---|---|
| 4,530,052 | 7/1985 | King et al. | 364/200 |
| 4,533,996 | 8/1985 | Hartung et al. | 364/200 |
| 4,675,814 | 6/1987 | Murai et al. | 364/300 |
| 4,799,145 | 1/1989 | Goss et al. | 364/200 |
| 5,210,875 | 5/1993 | Bealkowski et al. | 395/700 |
| 5,230,052 | 7/1993 | Dayan et al. | 395/700 |
| 5,388,267 | 2/1995 | Chan et al. | 395/700 |
| 5,473,775 | 12/1995 | Sakai et al. | 395/700 |
| 5,519,843 | 5/1996 | Moran et al. | 395/430 |

FOREIGN PATENT DOCUMENTS 63-120339  5/1988  Japan ................. G06F 9/46

Primary Examiner—Ayaz R. Sheikh
Assistant Examiner—Omar A. Omar
Attorney, Agent, or Firm—Anthony N. Magistrale

[57] ABSTRACT

Disclosed is a personal computer system which includes a central processing unit (CPU) coupled to a direct access storage device (DASD) and a random access memory (RAM). A flash memory module is coupled to the CPU and an input/output (IO) bus and includes a basic input output system (BIOS) stored therein. The BIOS is effective for responding to the energization of the computer system by initiating a power on self test (POST). The BIOS is further operative on completion of the POST for transferring a portion of BIOS from the module to the RAM and for transferring control of the of the computer system to the BIOS portion. The portion of BIOS is operative to load a protected mode operating system (OS) into RAM and transfer control to the OS. The system further includes a logic circuit coupled to the flash memory module and the IO bus for allowing the BIOS in flash memory to be accessed while the protected mode OS is running.

12 Claims, 7 Drawing Sheets ion program sets the EEPROM and special circuitry in a mode that allows the EEPROM to be erased and then reprogrammed with the updated BIOS code while the module is still installed in the system. A further advancement was the development of flash memory. Flash memory is a lower cost type of EEPROM that is erased and programed in a block mode rather than on a byte by byte basis.

COMPUTER SYSTEM HAVING FLASH MEMORY BIOS WHICH CAN BE ACCESSED WHILE PROTECTED MODE OPERATING SYSTEM IS RUNNING

BACKGROUND OF THE INVENTION

1. Field of the Invention

The present invention relates to personal computer systems and more particularly to a personal computer which includes a flash memory having a basic input output system (BIOS) stored therein which can be accessed locally or remotely over a network while the system is running a protected mode operating system.

2. Description of Related Art

Personal computer systems are well known in the art. Personal computer systems have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including random access memory (RAM) and Basic Input/Output System (BIOS) Read Only Memory (ROM), a system monitor, a keyboard, one or more flexible diskette drives, a fixed disk storage drive (also known as a "hard drive"), and a so-called "mouse" pointing device. One of the distinguishing characteristics of these systems is the use of a motherboard or system planar to electrically connect these components together. These systems are designed primarily to give independent computing power to a single user. Examples of such personal computer systems are IBM's PC 300 series and Aptiva.

Since the technology is rapidly changing and consumers are driving the demand for new hardware and input/output (IO) devices to be added to the computer systems, modification to the BIOS has become a significant problem in the pre- and post-development cycle of the personal computer system.

In the past BIOS was stored in non-volatile ROM or Erasable Programmable Read Only Memory (EPROM) modules. These memory modules must be removed and replaced with new modules in order to change or update the BIOS. More recent systems have begun to utilize Electrically Erasable Programmable Read Only Memory (EEPROM) so that the BIOS could be updated while the modules were still installed in the system. This is accomplished by special circuitry on the system board used in conjunction with a special application program. The application program sets the EEPROM and special circuitry in a mode that allows the EEPROM to be erased and then reprogrammed with the updated BIOS code while the module is still installed in the system. A further advancement was the development of flash memory. Flash memory is a lower cost type of EEPROM that is erased and programed in a block mode rather than on a byte by byte basis.

However, a problem exists with in-system BIOS updates when a protected mode operating system such as Windows 95, Windows NT and OS/2 is in control of the computer system. Under a protected mode operating system, application programs are prohibited from accessing critical system resources. This is done to improve system security and reliability. Under a real mode operating system such as IBM PC DOS only a single application program normally runs at any given time and it may have full unrestricted access to all of the system resources. The system BIOS is considered a critical system resource in a protected mode operating system and therefore applications are not permitted to modify BIOS while the protected mode operating system is running. Accordingly, if an application program tried to access (e.g., read or write) the BIOS, it would conflict with the operating system and cause a protection violation or in some cases even a system crash. The cache memory in such a system must also be disabled and flushed to be able to get coherent access to the BIOS address space. This is not possible under a protected mode operating system. Applications do not have access to the cache control hardware. The current solution is to reboot the system in a real mode operating system (e.g., DOS) and then reprogram the BIOS. However, the disadvantage is that this prevents remotely accessing the BIOS over a network while the protected mode OS is running as someone must reboot the system to a real mode operating system before the access could begin.

It is therefor desirable to provide a personal computer system which includes flash memory BIOS that can be accessed locally or remotely without interfering with the running protected mode operating system.

SUMMARY OF THE INVENTION

One embodiment of the present invention is directed to a computer system for allowing BIOS to be accessed while a protected mode operating system is running on the computer system. The system includes a processor (CPU) coupled to a local bus and an input/output (IO) bus. A direct access storage device (DASD) is electrically coupled to the CPU. A random access memory (RAM) is the main memory and is electrically coupled to the CPU. A flash memory module is coupled to the CPU and the IO bus and includes BIOS which is effective for responding to the energization of the computer system by initiating a power on self test (POST). At its completion the POST activates a boot loader module to load the operating system into RAM and transfer control to the operating system. A logic circuit is coupled to the flash memory module and the IO bus for allowing the BIOS in the flash memory to be accessed while the protected mode operating system is running.

Another embodiment of the present invention is directed to a computer system for allowing BIOS resident therein to be accessed by a remote computer system while a protected mode operating system is running on the computer system. The local system includes a CPU coupled to a local bus and an IO bus, a direct access storage device (DASD) and a random access memory (RAM) electrically coupled to the CPU. A flash memory module is coupled to the CPU and the IO bus and includes a BIOS which is effective for responding to the energization of the computer system by initiating a power on self test (POST). At its completion the POST activates a boot loader module to load the operating system into RAM and transfer control to the operating system. The remote computer system includes a storage device for storing data which is to be written to the BIOS in the flash memory module. A logic circuit is coupled to the flash memory module and the IO bus for allowing the remote computer system to access the BIOS in the flash memory while the protected mode operating system is running.

The present invention provides the advantage that BIOS can now be accessed (e.g., read from, written to, updated, modified, etc.) while a protected mode operating system is running without the need to reboot to a DOS operating system. This allows local BIOS updates via the system's DASD or remote BIOS updates over a network without effecting the end user.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. This application is written for those very familiar with all aspects of computer system design.

Figure 1:
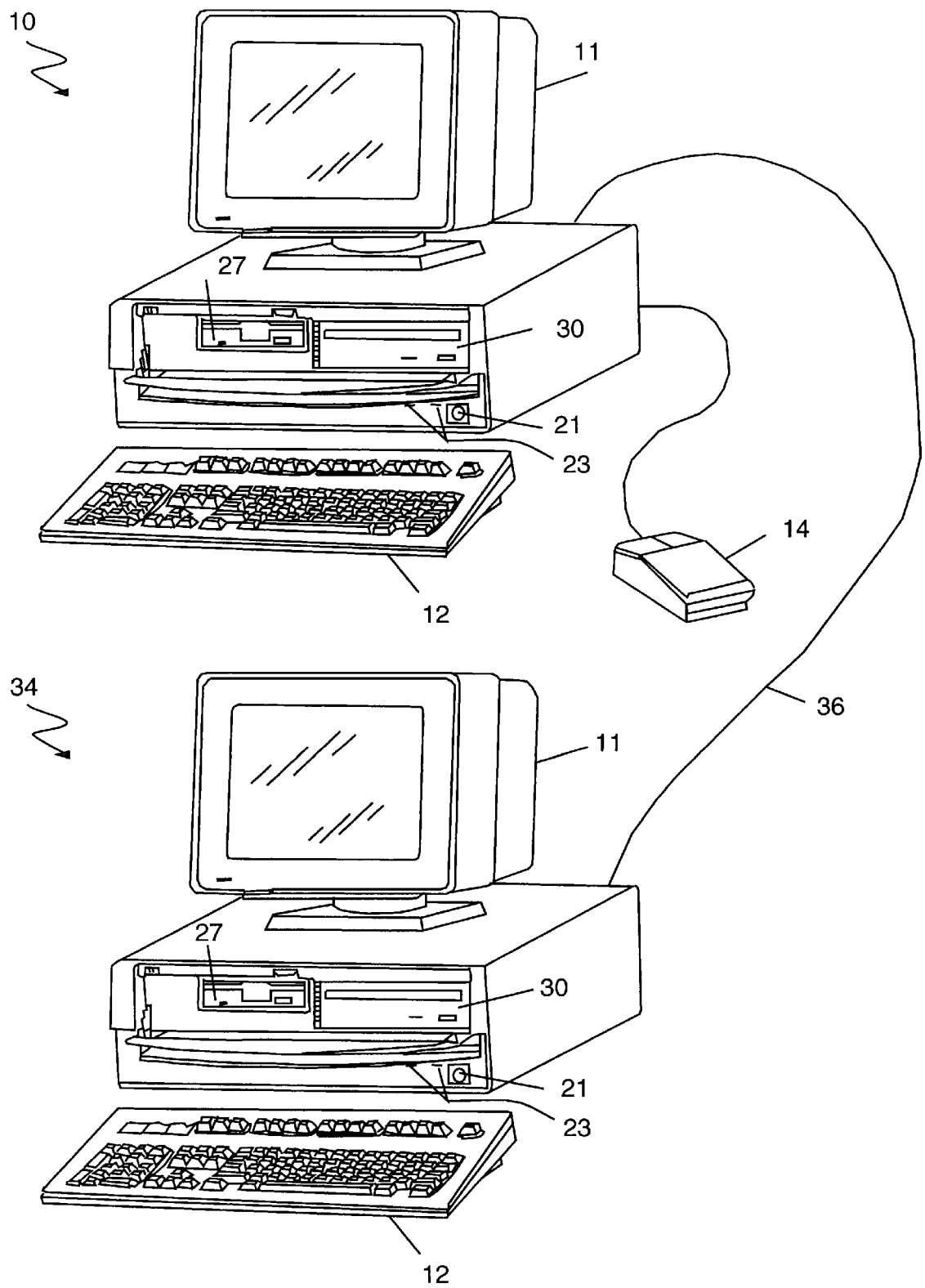
FIG. 1 is a perspective view of a personal computer embodying this invention and a LAN station remote computer system.

Referring now more particularly to the accompanying drawings, a computer system embodying the present invention is there shown and generally indicated at 10 (FIG. 1). As mentioned hereinabove, the computer 10 may have an associated display monitor 11, keyboard 12, mouse 14, and printer or plotter (not shown). The computer 10 has a cover 15 which is a decorative outer member (FIG. 2) and a back plate shield member 18 which cooperate with a chassis 19 in defining an enclosed, shielded volume for receiving electrically powered data processing and storage components for processing and storing digital data. At least certain of these components are mounted on a multi layer planar 20 or motherboard which is mounted on the chassis 19 and provides a means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the operating components of the microcomputer.

Figure 2:
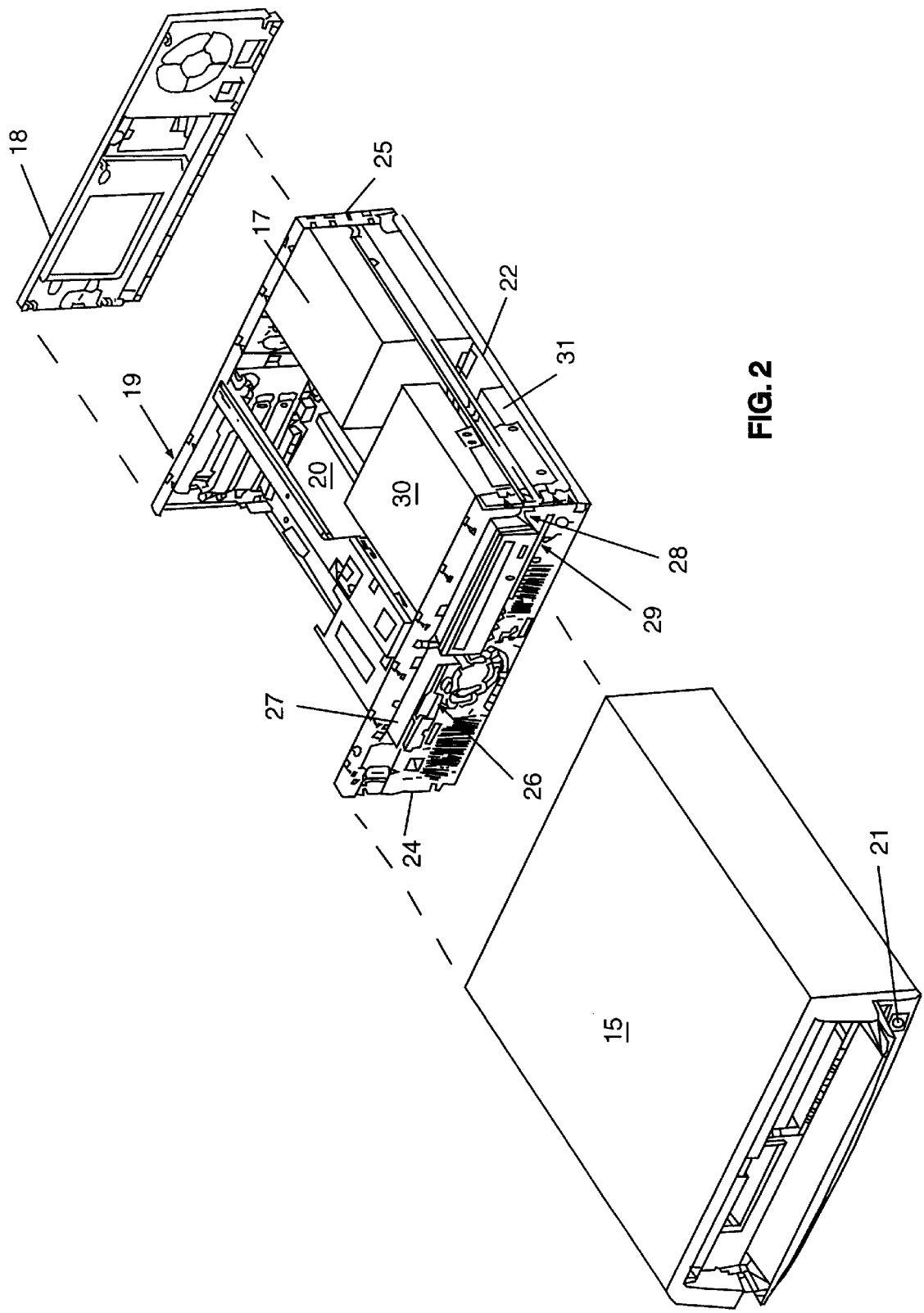
FIG. 2 is an exploded perspective view of certain elements of the personal computer of FIG. 1 including a chassis, a cover, an electromechanical direct access storage device and a planar board and illustrating certain relationships among those elements.

The system 10 has a power supply 17, a power button 21, also herein referred to as switch 21, and power/feedback LED 23. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a lower bay 29 are provided. One of the upper bays 26 is adapted to receive peripheral drives of a first size (such as those known as 3.5 inch drives) while the other 28 is adapted to receive drives of a different size (such as a CD ROM drive) and the lower bay is adapted to receive another drive. One floppy disk drive is indicated at 27 in FIGS. 1 and 2, and is a removable medium direct access storage device (DASD) capable of receiving a diskette inserted there into and using the diskette to receive, store and deliver data as is generally known. One CD ROM drive is indicated at 30 in FIGS. 1 and 2 and is a removable medium direct access storage device capable of receiving a compact disc inserted there into and using the disc to deliver data as is generally known. One hard disk drive is indicated at 31 in FIG. 2 and is a fixed medium direct access storage device capable of storing and delivering data as is generally known.

Figure 3:
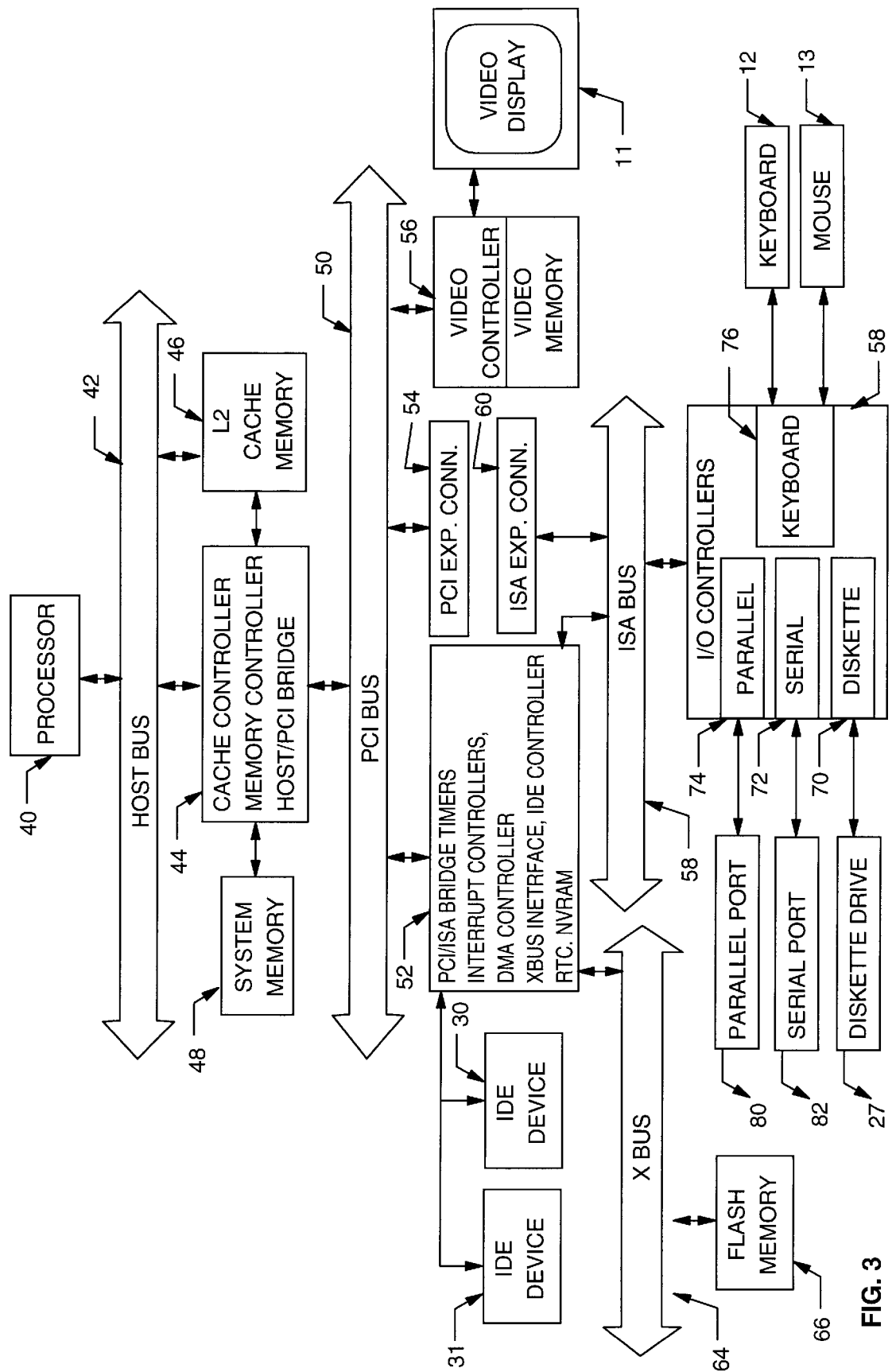
FIG. 3 shows a block diagram of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar 20 to the IO expansion connectors and other hardware of the personal computer system. Connected to the planar 20 is the system CPU or processor 40 which is connected directly to a high speed CPU host bus 42. A first system core logic chipset 44 and L2 cache memory 46 are also connected to the host bus 42. The first core logic chipset 44 includes a memory control unit, a L2 cache controller. and a peripheral component interconnect (PCI) bridge. The memory control unit is further connected to a volatile random access memory (RAM) 48. The RAM memory 48 is composed of one or more memory modules. The memory controller includes the logic for mapping addresses to and from the microprocessor 40 to particular areas of RAM 48. The cache controller is operatively coupled to the L2 cache memory 46.

The first core chipset 44 can be, for example, a Triton VX chip which is sold by Intel Corporation. The PCI bridge within chipset 44 provides an interface between the local bus 42 and a PCI bus 50. Connected to the PCI bus 50 is a second core chipset 52 and a plurality of PCI expansion connectors 54 for receiving PCI bus compatible peripheral cards. One such peripheral card is a video controller 56. The video controller 56 includes video memory and is coupled to the monitor or video display terminal 11. The chipset 52 can be, for example, an PIIX3 chip which is also sold by Intel Corporation.

The chipset 52 contains a bus control and timing unit, a plurality of timers, an interrupt controller, a DMA unit, nonvolatile CMOS RAM, also herein referred to as NVRAM, a CMOS real-time clock (RTC), an XBus controller, a PCI/ISA bridge and an integrated drive electronics (IDE) controller. The PCI/ISA bridge provides an interface between the PCI bus 50 and an optional feature or expansion bus such as the Industry Standard Architecture (ISA) bus 58. Connected to the ISA bus 58 are a plurality of ISA expansion connectors 60 for receiving ISA adapter cards (not shown). ISA adapter cards can be pluggably connected to the ISA expansion connectors 60 and may provide additional IO devices or memory for the system 10.

The IDE controller provides for the attachment of IDE compatible storage devices 62 such as the fixed disk drive 31 and CD-ROM drive 30.

The real-time clock is used for time of day calculations and the NVRAM is used to store system configuration data.

That is, the NVRAM will contain values which describe the present configuration of the system 10. For example, NVRAM contains information describing the capacity of a fixed disk or diskette, the type of display, the amount of memory, time, date, etc.

Coupled to the ISA bus 58 is a multi-function IO controller 68 such as a National Semiconductors PC87306. The IO controller 68 contains a variety of IO adapters and other components such as the diskette adapter 70, serial adapter 72, a parallel adapter 74 and keyboard controller 76. The diskette adapter 70 provides the interface to the diskette drive 27. The serial adapter 72 has an external port connector 82 for attachment of external devices such as modems (not shown). The parallel adapter 74 has an external port connector 80 for attachment of external devices such as printers (not shown). The keyboard controller 76 is the interface for the keyboard 12 and the mouse 13.

The planar XBus 64 includes address, data, and control components respectively. The planar XBus 64 is an additional IO bus in system 10 and is used as a local bus to support slow speed peripheral devices that reside on the planar board. Attached to the XBus 64 is a flash memory (FM) module or chip 66.

The flash memory (FM) 66 is an electrically erasable programmable read only memory (EEPROM) module or chip and includes the BIOS that is used to interface between the IO devices and the operating system. BIOS stored in memory 66 can be copied into RAM 48 to decrease the execution time of BIOS. FM 66 is further responsive to the XBus controller (via ROMSEL signal) within chipset 52. If System RAM 48 is disabled for the BIOS address range then access requests to that address range are passed through the Host Bridge 44 and the PCI/ISA Bridge to FM 66. If System RAM 48 is enabled for the BIOS address range then access requests to that address range are directed to system RAM 48. The operation of BIOS in flash memory 66 will be described in more detail below.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 40 could be an Intel Pentium processor, Cyrix 586-P75 processor or Advanced Micro Devices 8486 processor or any other suitable microprocessor.

The microcomputer system 10 is shown with 16 megabytes of system memory 48. It is understood that additional memory can be interconnected as represented in FIG. 3 by installing additional or higher-density memory modules. For purposes of illustration only, the present invention is described with reference to the 16 megabyte memory configuration.

Referring back to FIG. 1, there is shown the local computer system 10 along with a perspective view of a remote personal computer 34. While not here shown or described in detail, the remote computer system 34 has components and attributes like those illustrated and described with regard to FIG. 3 and those additional elements appropriate to provide the non-volatile storage mentioned, as is known to the person skilled in the appropriate arts. A storage means associated with the remote computer 34 can be a non-volatile means such as a direct access storage device (DASD) in the form of a hard disk device, diskette, compact disc or the like.

The local and remote computers 10, 34 are associated one with the other through some form of local area network (LAN) or the like, in which effective communication may be established through electrically conductive connections, through fiber optical links, through infrared or other radiation links, or in other manners. Such a link is indicated in FIG. 1 at 36. The network may be a token-ring network or an Ethernet network, or other known type of network. Each of the computers may be a "personal computer" as defined herein. Alternatively, the remote computer 34 may be some computer having capabilities other than those ascribed herein to a "personal computer", and possibly beyond those capabilities.

While the term "remote" is used with reference to the computer system 34 through which the LAN station local computer system 10 accesses BIOS, that term is used in the sense of indicating separation, rather than in the sense of indicating a large physical distance between the systems. In fact, such system may be physically adjacent in some network arrangements.

In operation, the system processor 40 operates under a protected mode operating system (e.g., IBM's OS/2 or Microsoft's Windows 95 operating system). These types of operating systems include a BIOS interface between system processor, peripherals, such as a keyboard, monitor, accessory function cards, and the operating system. BIOS is stored in flash memory 66 on the planar and hereinafter will be referred to as ROM BIOS. BIOS provides an interface between the hardware and the operating system software to enable a programmer or user to program machines without an in depth operating knowledge of a particular peripheral. For example, a BIOS disk module permits a programmer to program for DASD access without an in depth knowledge of the hardware.

Figure 4:
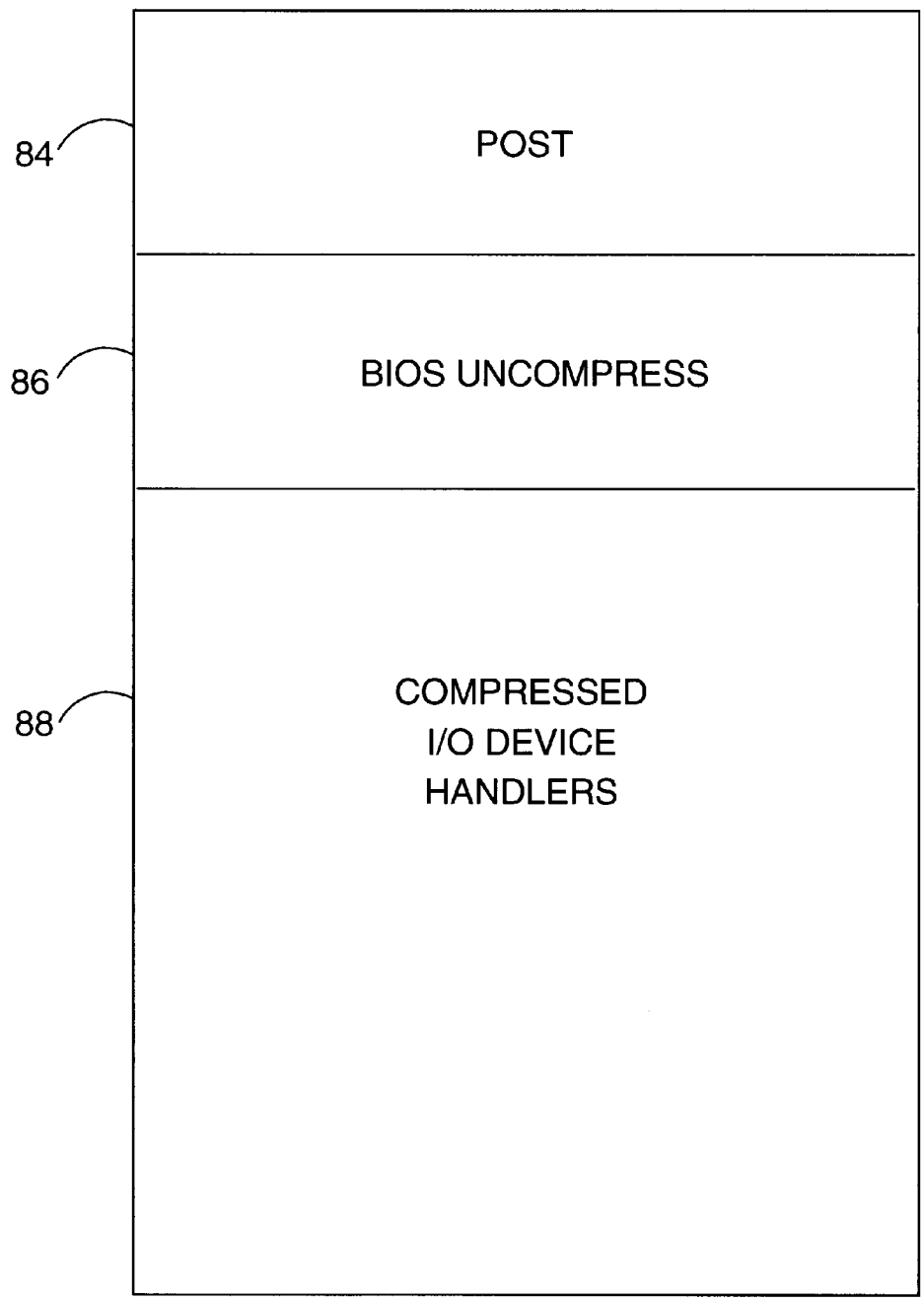
FIG. 4 is a memory map showing the different code modules which comprise ROM BIOS on the planar of the computer system of FIG. 1.

Before discussing the features of the present invention in more detail, it is believed to be helpful to review the conventional methods for loading BIOS and an operating system upon power up from the hard disk 31, diskette within diskette drive 27 or compact disc in CD-ROM drive 30. Turning now to FIG. 4, there is shown a memory map showing the different code modules which comprise ROM BIOS.

ROM BIOS includes a power on self test (POST) module 84, BIOS uncompressed module 86, and the compressed IO devices handlers 88. The POST module 84 performs system initialization and tests. The BIOS uncompressed module 86 uncompresses all the rest of the BIOS modules and transfers them to system RAM 48 (shadow RAM). All of the modules that are not needed during the initial setup of the system are stored in the BIOS flash memory 66 in a compressed form to conserve memory space. IO device handlers for the diskette drive 27, fixed disk drive 31, video controller 56, serial port 82, parallel port 80 and keyboard 12 may be stored in this compressed form.

Briefly, in operation, when the system 10 is powered up, the CPU 40 is vectored to the entry point of POST. The POST module 84 initializes the system and tests basic system functions. The BIOS code is then uncompressed and transferred from the flash memory 66 to system RAM 48.

System control is then transferred to the BIOS image which is now in main memory 48. The BIOS image, now executing in RAM 48, succeeds ROM BIOS (i.e., the uncompressed BIOS code is loaded into the address space previously occupied by ROM BIOS) and loads the protected mode operating system from the hard disk 31, diskette, or compact disc into RAM 48 to begin operation of the personal computer system 10 (i.e., control of the system 10 is now transferred to the operating system).

Figure 5:
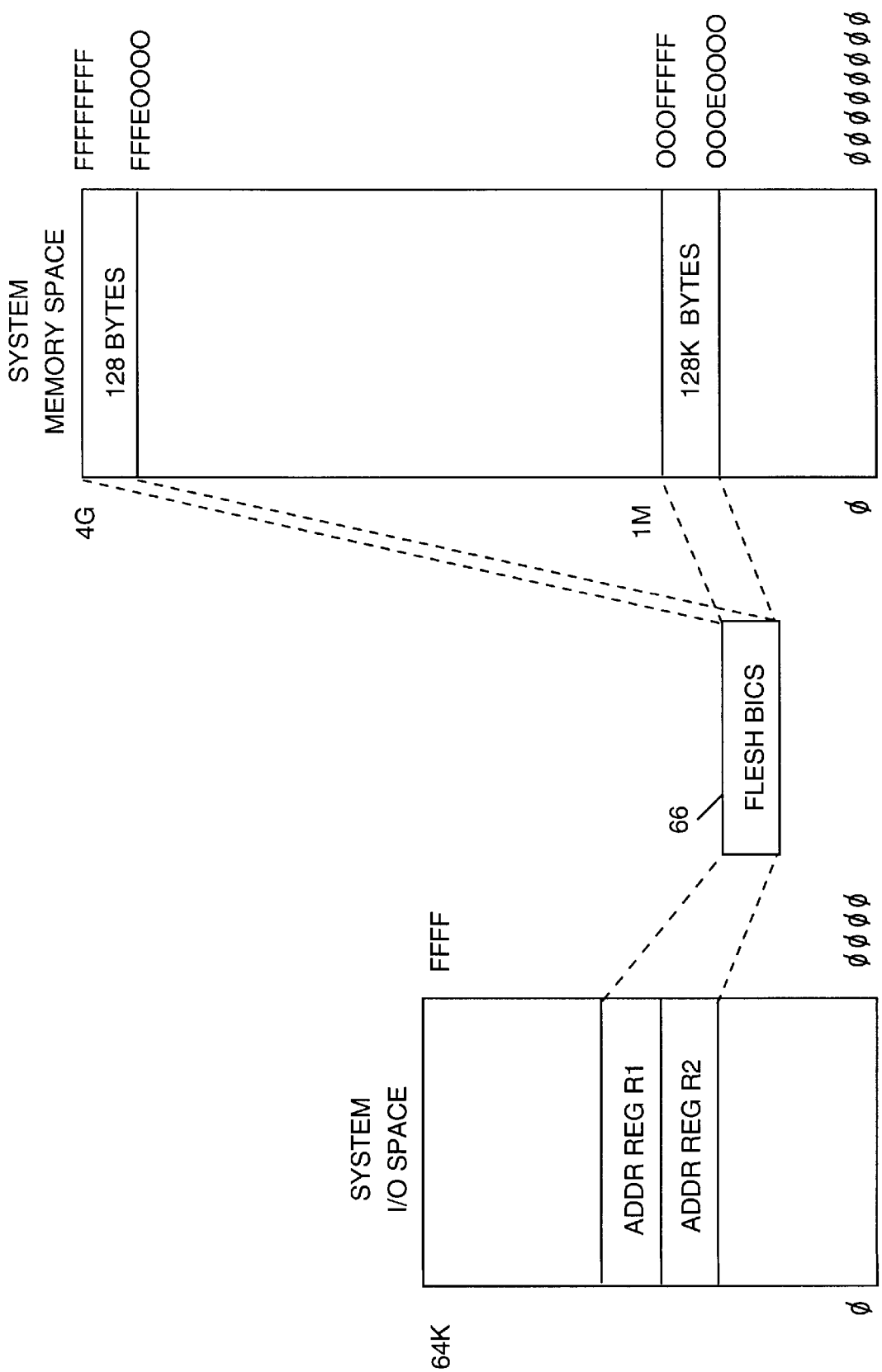
FIG. 5 is a diagram for use in explanation of a relationship between addresses of the BIOS in flash memory 66 and addresses of main memory and IO memory after BIOS has been loaded into main memory.

The BIOS in flash memory 66 or RAM 48 must appear at two locations in the system memory map (see FIG. 5). The first location is in low memory below the 1 megabyte point and is required to support the system processor 40 when it is operating in real mode. The first location is below the 1 megabyte point because the system cannot access memory above 1 megabyte in real mode. The first location is shown in FIG. 5 as the 128K area starting at address E0000H and ending at address FFFFFH. The second image or alias at the top of the memory map supports the processor 40 when it is operating in protected mode. The second location is shown in FIG. 5 as the 128K area starting at address FFFE0000H and ending at address FFFFFFFFH. Although the flash memory 66 is shown with 128K of memory 48, it should be understood that a different memory size can be used.

Figure 6:
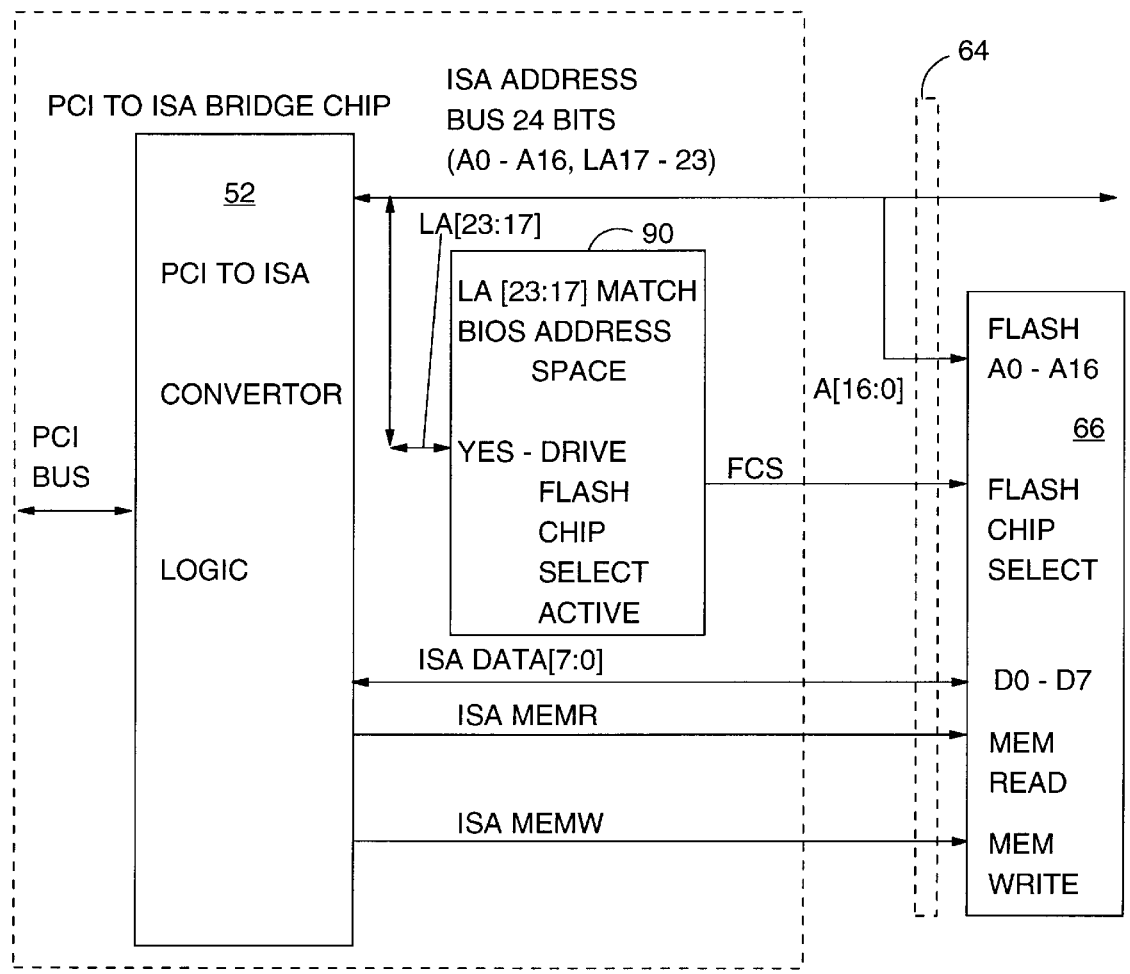
FIG. 6 is a diagram of the conventional hardware used to modify flash memory BIOS while a real mode operating system is running.

Turning now to FIG. 6, there is shown a diagram of the conventional elements which can be used to access the BIOS within the flash chip 66 only when a real mode operating system is running. The flash memory 66 is supplied with a 17 bit address (A0–A16) corresponding to its storage capacity of 128K bytes, a chip select signal (FCS), data signals D0–D7 a memory read signal (ISA MEMR) and a memory write signal (ISA MEMW). Bits A0–A16 of the 24 bit ISA bus address output from chip 52 are applied directly from the bridge logic 52 to the memory 66. The chip select signal FCS is produced by address decode logic 90 which receives the high order seven bits (latched address bits; LA17–LA23) of the 24 bit address output from the bridge logic 52. The address decode logic 90 generates the chip select signal FCS if the 24 bit address matches the FLASH enabled memory range.

In the conventional design of FIG. 6, when operating under a real mode operating system such as PC DOS, the flash memory 66 can be accessed generally in the following manner. The bridge logic 52 detects when a memory cycle is directed to the flash memory 66 on the XBus 64. An XBus access cycle is initiated and performed by the XBus controller in chip 52. If the access or operation is a read operation then data is provided by the flash memory 66 and passed through the PCI/ISA bridge 52 to the PCI bus 50 and then on to the processor 40. If the operation is a write operation then the processor 40 provides the data which is passed through the PCI/ISA bridge 52 over the XBus 64 to the flash memory 66. In both cases the address information is provided by the processor 40.

As an example, to write to flash memory location F000:0010 with a value of 55 h, a memory write cycle is executed by the processor 40 with the address lines conditioned to the value F000:0010 and the low eight bits of the data bus conditioned to a value of 56 h. This address and data will be passed from the processor 40 to the PCI bus 50 and then to the PCI/ISA bridge logic 52. The decode logic 90 will decode the seven high order address bits and generate a flash memory chip select signal when they match the flash enabled memory range. The 17 low order address bits (A0–A16) and the data bits (D0–D7) will be passed over the XBus 64 to the flash memory 66. The bridge logic 52 then generates (activates) a memory write signal (ISA MEMW) on the XBus 64. The flash chip 66 then writes the data on the XBus data lines into the memory location specified by the 17 bit address on the XBus address lines. This sequence can be repeated until all of the desired memory locations are written.

For a conventional read operation, the memory address to be accessed is also provided by the processor 40 as part of a standard memory cycle. As an example, to read from flash memory location F000:0010 having a value of 55 h, a memory read cycle is executed by the processor 40 with the address lines conditioned to the value F000:0010. This address will be passed from the processor 40 to the PCI bus 50 and then to the PCI/ISA bridge logic 52. The decode logic 90 will decode the seven high order address bits and generate a flash memory chip select signal when they match the flash enabled memory range. The 17 low order address bits (A0–A16) will be passed over the XBus 64 to the flash memory 66. The bridge logic 52 then generates (activates) a memory read signal (ISA MEMR) on the XBus 64. The flash chip 66 then drives the XBus data lines (D0–D7) with the data (55 h) stored in the memory location specified by the 17 bit address on the XBus address bus. This sequence can be repeated until all of the desired memory locatons are read.

As noted above, under conventional computer systems, the BIOS area in system memory 48 cannot be accessed while a protected mode operating system is running and in control. If a user attempted to read or write to the BIOS while the protected mode operating system was running, a protection violation or a system crash would occur. The only way to access the BIOS is to power down the system, reboot it in a Real Mode operating system (e.g., DOS), and then read or write to the BIOS at the memory location in the memory address space (E0000–FFFFF).

The present invention solves this problem and allows the user to access (e.g., read, write, update, modify, etc.) the BIOS in flash memory 66 while the protected mode operating system is running by allowing the flash memory 66 to be accessed without using the main memory 48 address space. The present invention allows the BIOS to be accessed while the protected mode OS is running because it does not conflict with the operating system which is running out of system memory 48 concurrently with the BIOS access and it doesn't conflict with cached data.

Figure 7:
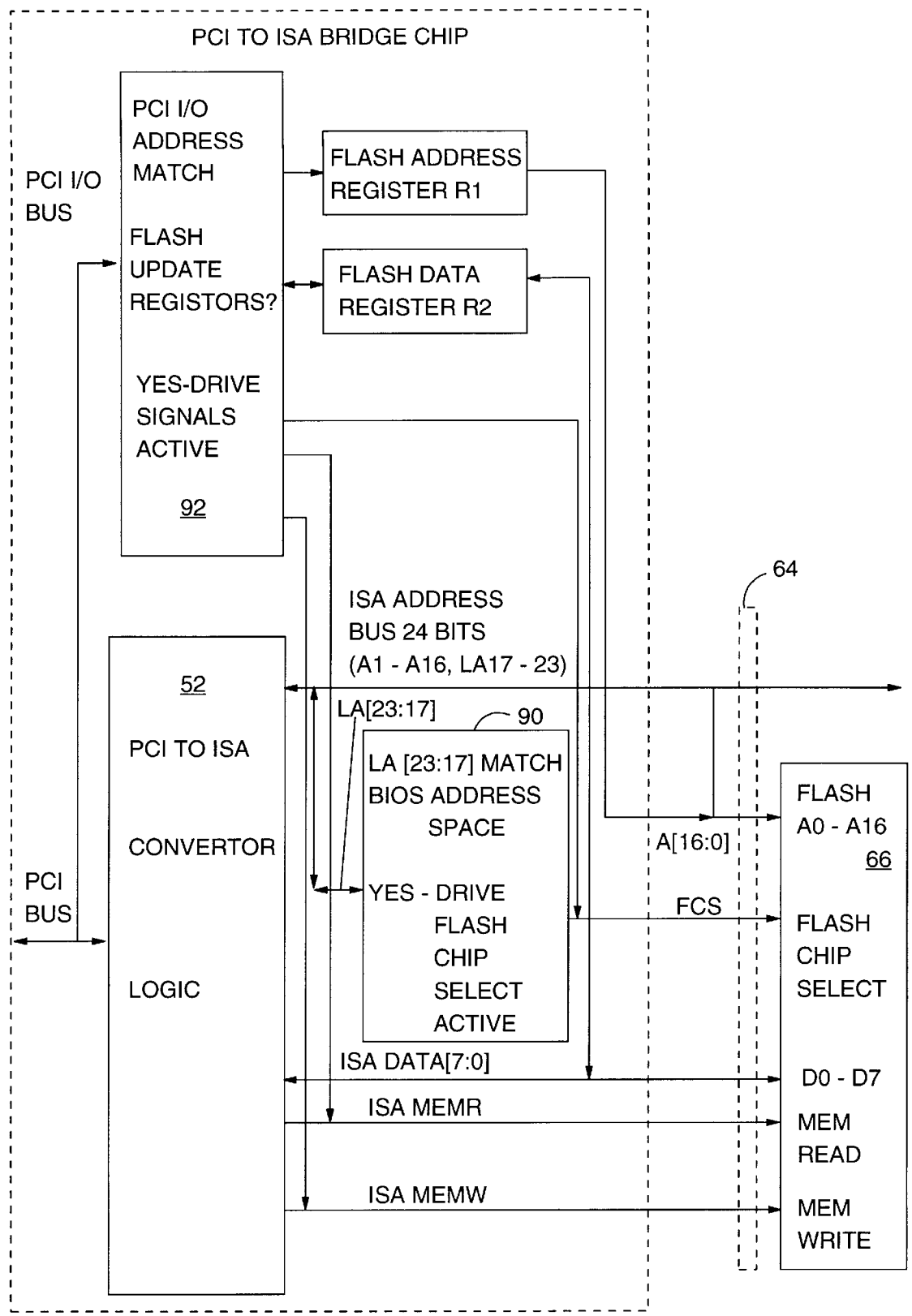
FIG. 7 is a diagram of the hardware circuit used in accordance with the present invention to access flash memory BIOS while a protected mode operating system is running.

Turning now to FIGS. 5 and 7, the present invention provides a path to access the flash memory 66 with the use of IO instructions while the protected mode operating system is running. The invention moves access to the flash memory 66 from the system memory address space, address E0000H to FFFFFH to the IO address space with two IO registers which can be located, for example, at address 5D0H to 5D1H, as shown by the dashed lines in FIG. 5. As will be described in more detail below, this allows the BIOS in memory 66 to be accessed via IO addressing. Since IO addressing does not interfere with protected mode operating systems, this does not conflict with the OS which is running out of main memory 48.

The additional hardware elements include a logic circuit 92, two registers (R1 and R2) and various connections between each of these elements and the flash chip 66. The logic circuit 92 is used to drive the control lines (ISA MEMR, ISA MEMR, FCS) connected to the flash 66 and drive the ISA A(17:0) address lines and the ISA data bus with the contents of R1 and R2 depending on whether the IO cycle is a read or write cycle. Two addresses in the system IO address space are used for the two registers. The addresses for the registers are selected so that there is no conflict with other IO devices. As an example, 5D0h could be used to access register R1 and 5D1h could be used to access the second register R2. The first register R1 is a 24 bit address register and is used to contain the 17 bit address corresponding to a location within the flash memory 66 that it is desired to read from or write to. The second register R2 is an 8 bit data register that provides temporary storage for (1) the data located in the flash memory 66 at the address specified in the first register R1 if the operation is a flash memory read, or (2) the new data that will be written to the flash memory 66 at the address specified in the first register R1 if the operation is a flash memory write. The system processor 40 uses normal IO read and write instructions to access these two registers.

The operation of the system 10 of the present invention for a read or write operation to be performed on the BIOS in flash memory 66 while a protected mode OS is running on system 10 will now be described with reference to FIGS. 5 and 7. The data to be written to the BIOS in flash 66 can be stored in a DASD (e.g., fixed disk, diskette, CD-ROM disc) of system 10 or a non-volatile storage device in remote computer 34. In operation, after the protected mode operating system is running and has control over system operation, if a local user or LAN administrator wishes to access (e.g., read from or write) the BIOS stored in the flash memory 66, he or she can execute an application program from their respective terminal or keyboard that will initiate an IO read or write cycle respectively, to access a location in flash memory 66.

For a write operation, the memory address to be accessed in flash memory 66 is provided by the processor 40 as part of a standard IO cycle. As an example, to write to flash memory location F000:0010 with a value of 55 h, an IO write cycle is executed by the processor 40 to the first register R1 (located at 5D0, for example) with a data value of 00010 h. This value is stored in R1. The processor 40 then executes an IO write to the second register R2 (located at 5D1h, for example) with a data value of 55 h. The logic circuit 92 then detects the IO write cycle to R2 and upon such detection, activates the flash memory chip select signal, outputs the 17 bit address from the address register R1 onto the address lines of the XBus 64 and outputs the 8 bits from the data register R2 on the XBus data lines. The logic circuit 92 then generates a memory write cycle to the flash memory 66 by activating the signal ISA MEMW on the XBus 64. The flash chip 66 then stores the data on the XBus data bus into the memory location specified by the 17 bit address on the XBus address bus. This sequence can be repeated until all of the desired memory locatons are written.

For a read operation, the memory address to be accessed in flash memory 66 is provided by the processor 40 as part of a standard IO cycle. As an example, to read from flash memory location F000:0010 having a value of 55 h, an IO write cycle is executed by the processor 40 to the first register R1 (located at 5D0, for example) with a data value of 00010 h. This value is stored in R1. The processor 40 then executes an IO read to the second register R2 (located at 5D1H, for example). The logic circuit 92 is operative to detect the IO read cycle to R2 and upon such detection, activate the flash memory chip select signal and output the 17 bit address from the address register R1 onto the address lines of the XBus 64. The logic circuit 92 then generates a memory read cycle to the flash memory 66 by activating the signal ISA MEMR on the XBus 64. The flash chip 66 then drives the XBus data lines (D0–D7) with the data (55 h) stored at memory location F000:0010 and the data is then latched into the data register R2 to be read by the processor 40. This sequence can be repeated until all of the desired memory locatons are read.

Neither of the above read or write operations to the flash 66 conflict with the OS or the BIOS that is running out of main memory 48 since IO addressing does not interfere with protected mode operating systems. In other words, the system does not know that it is accessing a critical system resource or protected device. If the cycle was an update cycle, then once the BIOS update is complete the user may continue to use the system 10 and its applications. However, the updated BIOS will not be effective until the user turns off system power and then turns it on again (or reboots the system 10). After the power has been turned on again, the system performs the POST mentioned above and the updated BIOS would then be loaded into main memory 48.

Thus, the present invention provides the advantage that BIOS can now be accessed while a protected mode operating system is running without the need to reboot to a DOS operating system. This allows local BIOS accesses (reads, writes, updates, etc.) via the computer system's DASD or remote BIOS accesses over the LAN without effecting the end user. In addition, the flash memory 66 still works under the conventional method using ISA MEMW, ISA MEMR so that basic operation is not effected.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A computer system for allowing BIOS to be accessed while a protected mode operating system is running on said computer system comprising:

a processor coupled to a local bus and an input/output (IO) bus;

a direct access storage device (DASD) being electrically coupled to the processor and being capable of storing a plurality of data records, a random access memory (RAM) being the main memory and electrically coupled to the system processor, a flash memory module coupled to said CPU and said IO bus, said module having a basic input output system (BIOS) stored therein and said BIOS is effective for responding to the energization of the computer system by initiating a power on self test (POST), wherein said BIOS is further effective on completion of the POST for transferring a portion of said BIOS from said module to said RAM and for transferring control of the of the computer system to said BIOS portion, said portion of said BIOS being operative to load the operating system into said RAM and transfer control to said operating system, a logic circuit coupled to said flash memory module and said IO bus for allowing said BIOS in said flash memory to be accessed while said protected mode operating system is running, first and second registers each coupled to said logic circuit and said flash memory module, said first register being capable of holding an address corresponding to an address within the flash memory and said second register being capable of holding data, wherein said processor is operative to initiate an access cycle to said flash memory by placing an address directed to a memory location in said flash memory in said first register, perform an IO cycle to said second register, and said logic circuit being operative to detect said IO cycle and upon so detecting, drive a memory cycle to access said flash memory, said memory cycle includes said logic circuit placing the address in the first register on the IO address bus and activating a flash memory chip select line, and wherein said access cycle is a write cycle and said processor is further operative to perform an IO write cycle to said second register to load said second register with data which is to be written to said flash memory, said logic circuit is further operative to place the data in the second register on an IO data bus and activate a write enable port of said flash memory wherein said flash memory then writes the data on the IO data bus into the flash memory at the memory location specified by the address on the IO address bus.

2. The computer system of claim 1, wherein said first and second registers are IO registers.

3. The computer system of claim 1, wherein said processor is operative to initiate a write cycle to said flash memory by placing an address directed to a memory location in said flash memory in said first register, perform an IO write cycle to said second register to load said second register with data which is to be written to said flash memory, and said logic circuit being operative to detect said IO write cycle and upon so detecting, drive a memory write cycle to said flash memory to transfer said data within said second register to said addressed memory location in said flash memory.

4. The computer system of claim 1, wherein said processor is operative to initiate a read cycle to said flash memory by placing an address directed to a memory location in said flash memory in said first register, initiating an IO read cycle to said second register, and said logic circuit being operative to detect said IO read cycle and upon so detecting, drive a memory read cycle to said flash memory to transfer data from said addressed memory location in said flash memory to said second register.

5. The computer system of claim 1, wherein said logic circuit is further operative to allow data to be read from or written to said BIOS in said flash memory while said protected mode operating system is running.

6. A computer system for allowing BIOS resident in said computer system to be accessed by a remote computer system while a protected mode operating system is running on said computer system comprising:

a processor coupled to a local bus and an input/output (IO) bus, a direct access storage device (DASD) being electrically coupled to the processor and being capable of storing a plurality of data records, a random access memory (RAM) being the main memory and electrically coupled to the system processor, a flash memory module coupled to said CPU and said IO bus, said module having a basic input output system (BIOS) stored therein and said BIOS is effective for responding to the energization of the computer system by initiating a power on self test (POST), wherein said BIOS is further effective on completion of the POST for transferring a portion of said BIOS from said module to said RAM and for transferring control of the of the computer system to said BIOS portion, said portion of said BIOS being operative to load the operating system into said RAM and transfer control to said operating system, said remote computer having memory means for storing data, a logic circuit coupled to said flash memory module and said IO bus for allowing said remote computer system to access said BIOS in said flash memory module while said protected mode operating system is running, first and second registers each coupled to said logic circuit and said flash memory module, said first register being capable of holding an address corresponding to an address within the flash memory and said second register being capable of holding data, and wherein said processor is operative to initiate a write cycle to said flash memory by placing an address directed to a memory location in said flash memory in said first register, perform an IO write cycle to said second register to load said second register with data which is to be written to said flash memory, and said logic circuit being operative to detect said IO write cycle and upon so detecting, drive a memory write cycle to said flash memory to transfer said data within said second register to said addressed memory location in said flash memory.

7. The computer system of claim 6, wherein said logic circuit is further operative to allow said data to be transferred from said memory means in said remote computer system to said BIOS in said flash memory module while said protected mode operating system is running.

8. The computer system of claim 7, further comprising:

register means coupled to said logic circuit and said flash memory module for temporarily receiving said data from said remote memory means before said data is transferred to said BIOS in said flash memory module.

9. The computer system of claim 11, wherein said first and second registers are IO registers.

10. The computer system of claim 11, wherein said logic circuit is further operative to allow data to be read from or written to said BIOS in said flash memory while said protected mode operating system is running.

11. A computer system for allowing BIOS to be accessed while a protected mode operating system is running on said computer system comprising:

a processor coupled to a local bus and an input/output (IO) bus, a direct access storage device (DASD) being electrically coupled to the processor and being capable of storing a plurality of data records, a random access memory (RAM) being the main memory and electrically coupled to the system processor, a flash memory module coupled to said CPU and said IO bus, said module having a basic input output system (BIOS) stored therein and said BIOS is effective for responding to the energization of the computer system by initiating a power on self test (POST), wherein said BIOS is further effective on completion of the POST for transferring a portion of said BIOS from said module to said RAM and for transferring control of the of the computer system to said BIOS portion, said portion of said BIOS being operative to load the operating system into said RAM and transfer control to said operating system, a logic circuit coupled to said flash memory module and said IO bus for allowing said BIOS in said flash memory to be accessed while said protected mode operating system is running, first and second registers each coupled to said logic circuit and said flash memory module, said first register being capable of holding an address corresponding to an address within the flash memory and said second register being capable of holding data, wherein said processor is operative to initiate an access cycle to said flash memory by placing an address directed to a memory location in said flash memory in said first register, perform an IO cycle to said second register, and said logic circuit being operative to detect said IO cycle and upon so detecting, drive a memory cycle to access said flash memory, said memory cycle includes said logic circuit placing the address in the first register on the IO address bus and activating a flash memory chip select line, and wherein said access cycle is a read cycle and said processor is further operative to initiate an IO read cycle to said second register, said logic circuit is further operative to activate a read enable port of said flash memory wherein said flash memory then drives the IO data bus with the contents stored in the memory location specified by the address on the IO address bus and the data is latched into the second register to be read by said system.

12. A computer system for allowing BIOS resident in said computer system to be accessed by a remote computer system while a protected mode operating system is running on said computer system comprising:

a processor coupled to a local bus and an input/output (IO) bus, a direct access storage device (DASD) being electrically coupled to the processor and being capable of storing a plurality of data records, a random access memory (RAM) being the main memory and electrically coupled to the system processor, a flash memory module coupled to said CPU and said IO bus, said module having a basic input output system (BIOS) stored therein and said BIOS is effective for responding to the energization of the computer system by initiating a power on self test (POST), wherein said BIOS is further effective on completion of the POST for transferring a portion of said BIOS from said module to said RAM and for transferring control of the of the computer system to said BIOS portion, said portion of said BIOS being operative to load the operating system into said RAM and transfer control to said operating system, said remote computer having memory means for storing data, a logic circuit coupled to said flash memory module and said IO bus for allowing said remote computer system to access said BIOS in said flash memory module while said protected mode operating system is running, first and second registers each coupled to said logic circuit and said flash memory module, said first register being capable of holding an address corresponding to an address within the flash memory and said second register being capable of holding data, and wherein said processor is operative to initiate a read cycle to said flash memory by placing an address directed to a memory location in said flash memory in said first register, initiating an IO read cycle to said second register, and said logic circuit being operative to detect said IO read cycle and upon so detecting, drive a memory read cycle to said flash memory to transfer data from said addressed memory location in said flash memory to said second register.

* * * * *